United States Patent [19]

Merle et al.

[11] Patent Number: 5,439,186
[45] Date of Patent: Aug. 8, 1995

[54] METHOD AND APPARATUS FOR ATTACHING OR DETACHING A FILMSTRIP TO A FILM CARTRIDGE

[75] Inventors: Thomas C. Merle; Dale W. Ryan, both of Rochester, N.Y.

[73] Assignee: Eastman Kodak Company, Rochester, N.Y.

[21] Appl. No.: 171,790

[22] Filed: Dec. 22, 1993

[51] Int. Cl.⁶ ............................................... G03B 1/00
[52] U.S. Cl. ............................................... 242/348.1
[58] Field of Search ................ 242/348, 348.1, 348.3, 242/550

[56] References Cited

U.S. PATENT DOCUMENTS

| | | |
|---|---|---|
| 3,586,258 | 6/1971 | Horlezeder . |
| 3,802,646 | 4/1974 | Nagel et al. . |
| 4,074,870 | 2/1978 | Kaufman . |
| 4,113,192 | 9/1978 | Osanai . |
| 5,031,852 | 7/1991 | Dowling et al. . |
| 5,093,686 | 3/1992 | Shigaki . |
| 5,215,273 | 6/1993 | Greene . |

FOREIGN PATENT DOCUMENTS

0582852A1  7/1993  European Pat. Off. .
4-122925   4/1992  Japan .

*Primary Examiner*—John P. Darling
*Attorney, Agent, or Firm*—Frank Pincelli

[57] ABSTRACT

A method and apparatus for attaching/detaching a filmstrip to a film cartridge having a take-up spool rotatably mounted therein and an access opening for allowing film to be inserted or removed from the cartridge. The apparatus includes a first positioning mechanism for positioning the film cartridge in a first orientation. An attachment tool is provided for movement between an non-engaging position and a first engaging position. A mechanism is provided for releasing the cartridge from its first orientation and for biasing the cartridge to a second orientation. The tool is then moved to a second engaging position whereby the filmstrip can be attached or detached from the spool.

18 Claims, 5 Drawing Sheets

METHOD AND APPARATUS FOR ATTACHING OR DETACHING A FILMSTRIP TO A FILM CARTRIDGE

CROSS REFERENCE TO RELATED APPLICATIONS

Reference is made to commonly assigned copending application Ser. No. 08/172,006 entitled "Tool for Filmstrip Attachment or Detachment", by Thomas C. Merle, Dale W. Ryan and David L. Rowden, which is hereby incorporated by reference.

1. Field of the Invention

The present invention is directed to film cartridges having a removable filmstrip, and more particular, to a method and apparatus for attaching or detaching a filmstrip to a film cartridge.

2. Background of the Invention

Current techniques for allowing attachment of a filmstrip to a cartridge require pre-positioning of a cartridge in a single orientation before attachment of the filmstrip occurs. This single position method requires that the features of the cartridge assembly and attach/detach apparatus be accurately controlled to allow repeatability.

Thus, a problem with prior art devices is that they generally require an extensive amount of complexity and cost in assuring that the cartridge is uniformly constructed and the mechanism used for attachment/detachment be designed with a high degree of accuracy so that the engagement tool properly engages the cartridge so that the filmstrip can be quickly and accurately attached to the cartridge.

SUMMARY OF THE INVENTION

In one aspect of the present invention there is provided a mechanism for attaching/detaching a filmstrip to a film cartridge having a take-up spool rotatably mounted therein and an access opening for allowing film to be inserted or removed from the cartridge. The mechanism includes a first positioning mechanism for positioning the film cartridge in a first orientation. An attachment tool is provided for movement between an non-engaging position and a first engaging position. A mechanism is provided for releasing the cartridge from its first orientation and for biasing the cartridge to a second orientation. The tool is then moved to a second engaging position whereby the filmstrip can be attached or detached from the spool.

In accordance with a second aspect of the present invention, there is provided the method of attachment of a filmstrip to a film cartridge comprising the steps of:
a. providing a cartridge having a take-up spool rotatably mounted therein, the cartridge having an access opening for allowing insertion and removal of the filmstrip into the cartridge and engagement with the spool;
b. positioning the cartridge in a first orientation;
c. positioning a reattachment tool so that a portion of the tool is positioned with respect to said film cartridge such that when the cartridge is released from said first position, the tool will maintain the cartridge in a second orientation;
d. releasing the cartridge from its first orientation;
e. biasing the cartridge in a direction such that the tool restricts further movement of the cartridge; and f. moving the tool to a second engaging position such that the filmstrip can be introduced into the cartridge for engagement and rewinding of the filmstrip thereon.

The present invention provides an apparatus and method for attaching or detaching a filmstrip from a cartridge which is simple in operation, is repeatable and minimizes the variances that may occur in the cartridge shell and thereby improves the reliability of the attach function since the mechanical actions are repeatable and thus insensitive to variations of the cartridge.

DETAILED DESCRIPTION OF THE DRAWINGS

DETAILED DESCRIPTION

Figure 1:
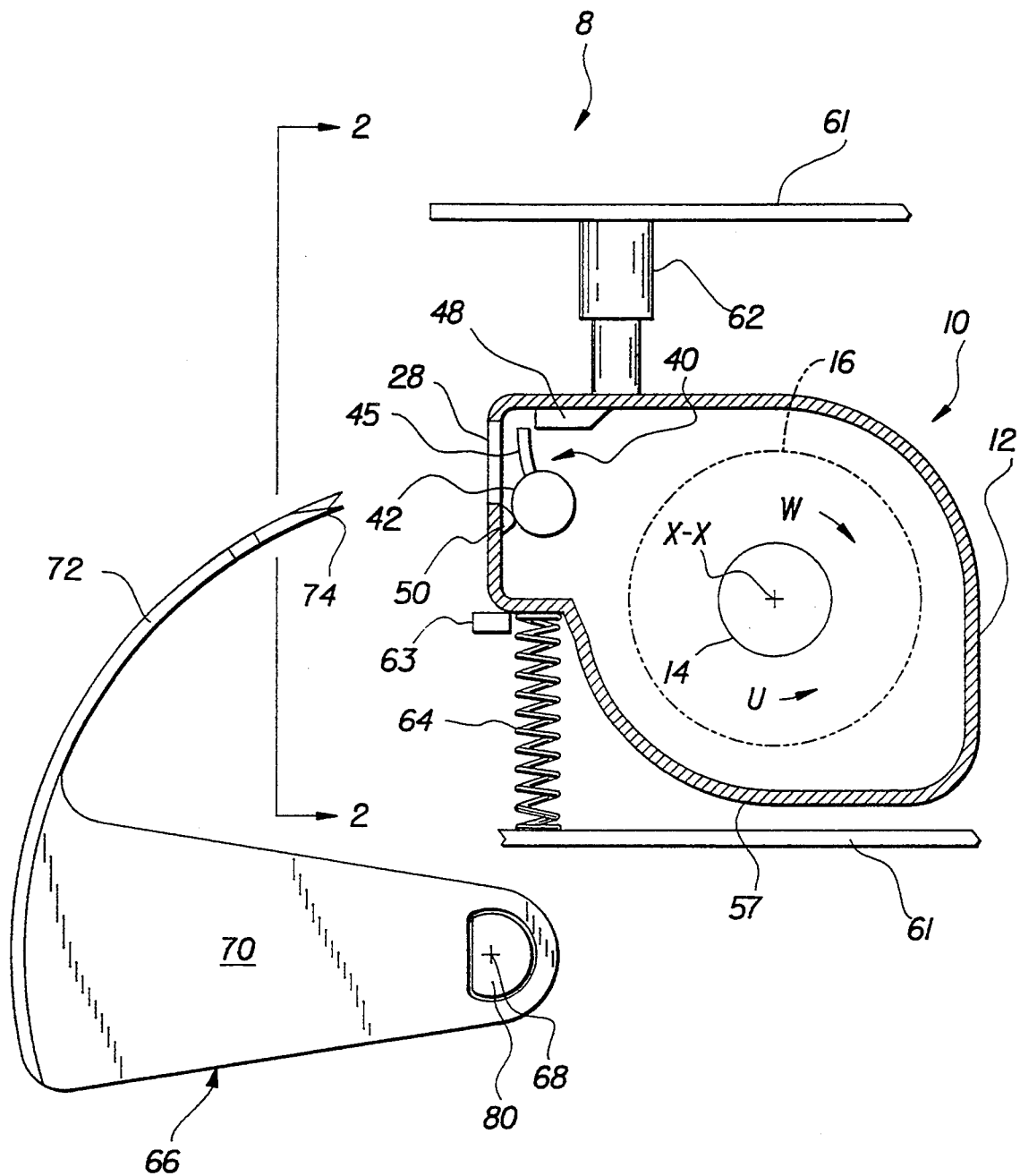
FIG. 1 is a cross-sectional view of a mechanism used to retain a film cartridge in position for attaching or detaching a filmstrip to a cartridge.

The invention is disclosed as being embodied in a filmstrip unwinding and winding apparatus to be used typically with a film cartridge. Certain features of this type cartridge and of the winding and unwinding the apparatus used to insert or remove the filmstrip is generally known, the description which follows is directed to, in particular, to elements forming a part of, or cooperating directly with the disclosed embodiment. It is to be understood, however, that other elements, not specifically shown or described, may take various forms known to persons of ordinary skill in the art.

Referring now to FIGS. 1-7 there is illustrated a portion of an apparatus 8 made in accordance with the present invention for removing or inserting a filmstrip 16 into or from a film cartridge 10. The film cartridge 10 comprises a cartridge shell 12 and a spool 14 rotatably mounted to the shell 12. In the particular embodiment illustrated, the cartridge 10 is designed to hold 24 mm size filmstrip, however, the cartridge 10 may be designed to contain any size film. The spool 14 is rotatable about an axis X in filmstrip winding and unwinding directions U and W inside the cassette shell 12. Thus, in the embodiment illustrated the cartridge 10 is of the thrust type. U.S. Pat. Nos. 5,031,852 and 5,215,273 disclose film cartridges/cassettes of the thrust type which are hereby incorporated by reference. The cartridge shell 12 consists of two shell halves 13,15 which are secured together by known means. A roll of filmstrip 16 is coiled about the spool 14 to form successive convolutions of the filmstrip 16. The filmstrip 16 includes an inner or trailing end portion 18 (see FIG. 8) which is detachably secured to the spool 14 (see FIGS. 9 & 10). In the particular embodiment illustrated, the trailing end portion 18 is provided with a pair of openings 20 which are designed to engage a pair of projections 22 formed in the hub 24 of the spool 14. The trailing end portion 18 is further provided with a drive opening 26 which, in the particular embodiment illustrated, is designed to engage an attachment tool 66 so that the trailing end portion 18 can be guided into the cartridge for attaching the filmstrip 16 to the spool 14 as is later discussed herein in detail.

The cartridge 10 is provided with a opening/slot 28 for allowing a filmstrip 16 to go in to or out of the cartridge. In the particular embodiment illustrated, the opening 28 has a substantially rectangular configuration having a top edge 32, a bottom edge 34 which are substantially coplanar to the top and bottom surface of the filmstrip 16 and a pair of oppositely disposed side edges 36,38. The particular height H and width W of the opening 28 is selected in accordance with the requirements of the cartridge 10 and filmstrip 16. In the particular embodiment illustrated, the opening 28 has a height of about 0.12 inches (0.30 cms) and a width of about 1.12 inches (2.84 cms).

A light valve/door 40 is provided which extends across the opening 28. The light valve 40, when in the closed position, prevents ambient light from entering the cartridge 10 through the opening 28, and when in the open position, allows filmstrip 16 to either be inserted or removed from the cartridge 10. In the particular embodiment illustrated, the light valve 40 comprises a rotatable shaft 42 having a pair of ends rotatably mounted to the side walls 44 of the shell 12. The shaft 42 includes a ledge section 45 configured such that when in the closed position, the ledge section 45 will abut against stop 48 provided on the interior of the shell adjacent the opening 28. A projection 50 is provided below the bottom edge 34 to assist in preventing any ambient light from passing into the cartridge. The shaft 42 and ledge section 45 are configured such that when the light valve 40 is in the open position, as illustrated in FIGS. 2-7, sufficient clearance is provided for allowing egress or ingress of the filmstrip 16 and tool 66 used to attach or detach the filmstrip 16. At least one end 43 of the shaft 42 extends through the shell halves 13,15 so that a drive tool, not shown, can engage the end 43 for moving the light valve 40 between the open and closed positions. It is to be understood that the present invention is not limited to the particular light valve 40 disclosed and that various other light valves may be used.

Figure 8:
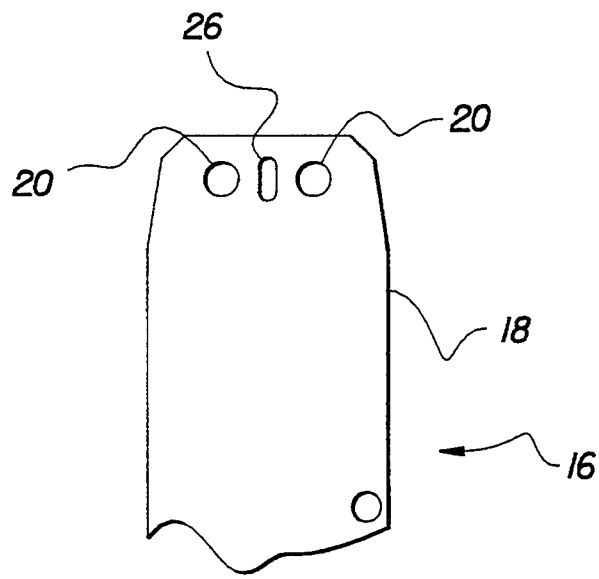
FIG. 8 is a top plan view of the end of the filmstrip which engages the spool.
Figure 9:
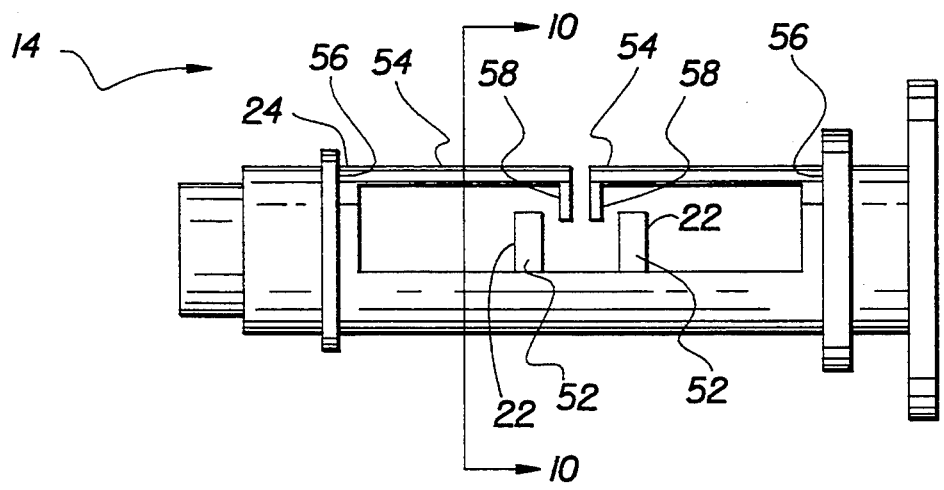
FIG. 9 is a elevational view of the spool of the cartridge of FIG. 1.
Figure 10:
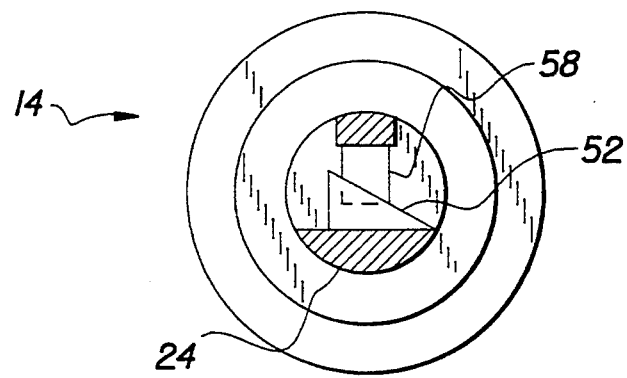
FIG. 10 is a cross-sectional view of the spool of FIG. 9 as taken along line 10—10.

Referring to FIGS. 9 and 10, there is illustrated an enlarged view of the spool 14. The spool 14 includes a pair of spaced projections 22 disposed in the central area of the hub 24 which are positioned so as to engage openings 20 in the trailing end portion 18 of the filmstrip 16 (see FIG. 8). Preferably, as illustrated, projections 22 are provided with an inclined surface 52 which assist in the reattachment of the filmstrip as discussed later herein. The spool 14 is also provided with a pair of flexible retaining members 54 which extend from each of the lateral ends 56 of spool 14 and terminate in a pair of downwardly extending contact members 58. The flexible members 54 assist in retaining the trailing end portion 18 of the filmstrip 16 on the spool 14 once projections 22 have engaged openings 20.

Referring to FIGS. 1-7 there is illustrated a portion of an apparatus 8 made in accordance with the present invention. The apparatus 8 includes means for mounting the cartridge 10 such that the cartridge can be rotated about the rotational axis X of the spool 14 so as to orient the cartridge between first and second tool engaging positions. In the embodiment illustrated the main body 57 of the cartridge 10 is mounted between a pair of mounting members 67 are which are rotatably mounted to the frame 61 of the apparatus 8. The mounting members 67 engage the ends of the spool 14 and allows the cartridge 10 to rotate about the X-X axis so that the cartridge 10 can move between the first and second orientations as is later discussed herein. Drive means, such as a drive motor, is connected to one of the mounting members 67 for rotating the spool 14 so as to thrust the filmstrip 16 out of the cartridge 10 or wind the filmstrip 16 on to the spool 14.

Figure 2:
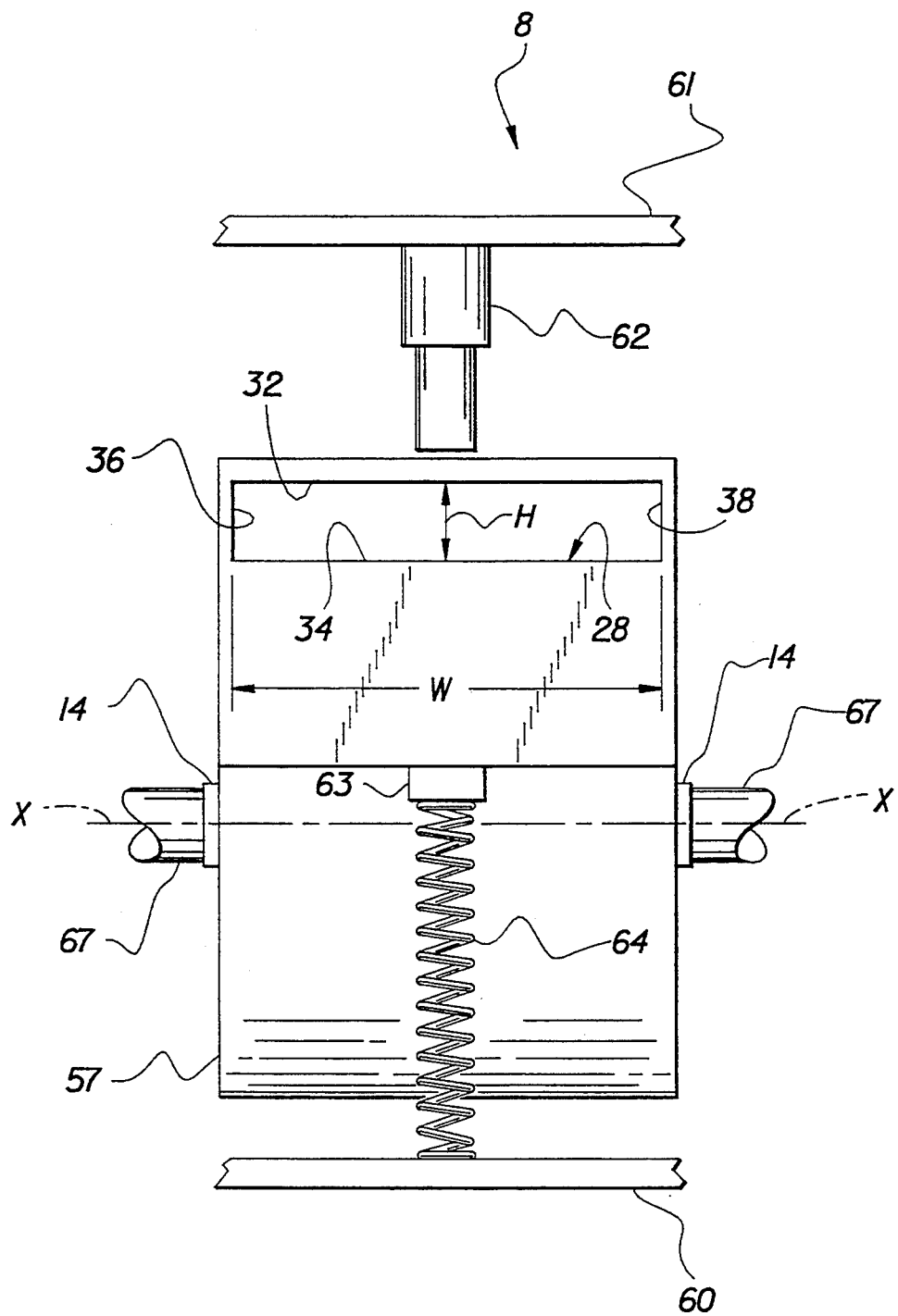
FIG. 2 is a front elevational view of the mechanism of FIG. 1 taken along line 2—2.
Figure 4:
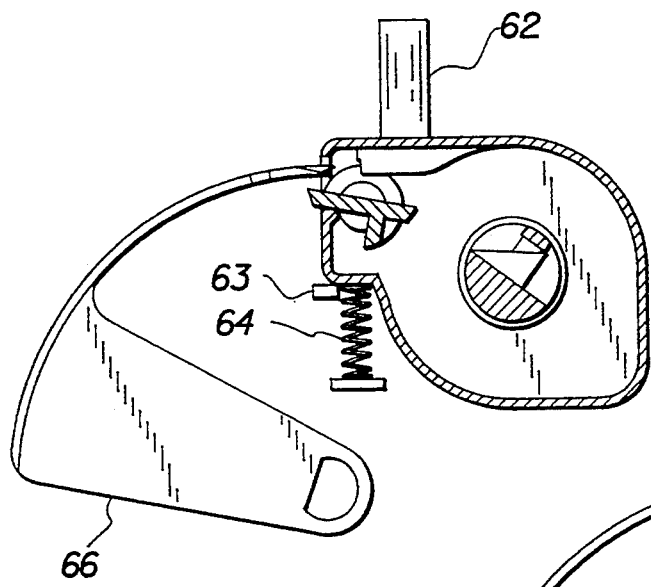
FIG. 4 is a view similar to FIG. 1 illustrating the attachment tool in a first engaging position.
Figure 5:
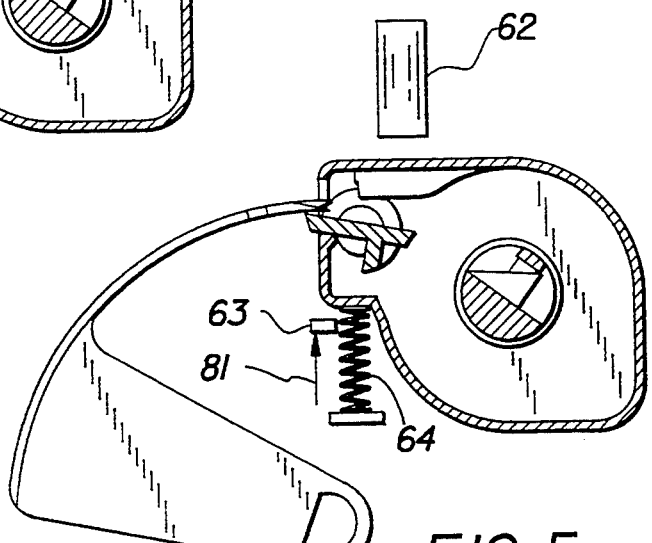
FIG. 5 is a view similar to FIG. 1 illustrating the mechanism used to hold the cartridge in a first orientation in the release position.
Figure 6:
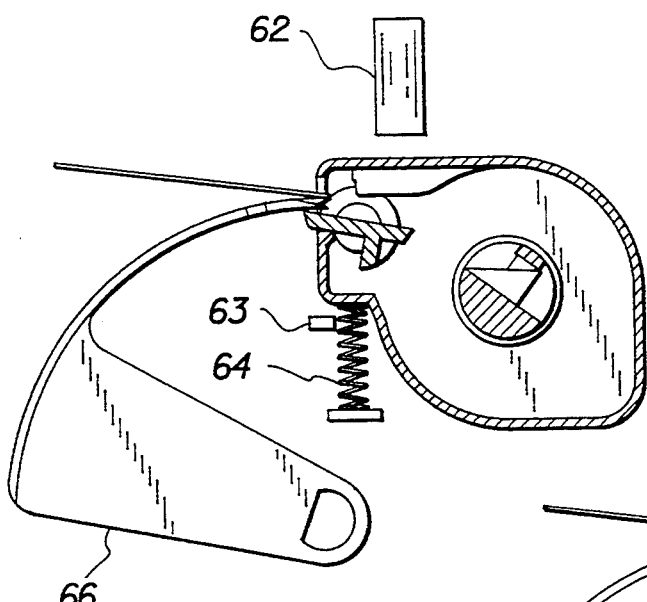
FIG. 6 is a view similar to FIG. 1 wherein the tool restricts further movement of a film cartridge so as to orient it in a second position and where the filmstrip is secured to the attachment tool.
Figure 7:
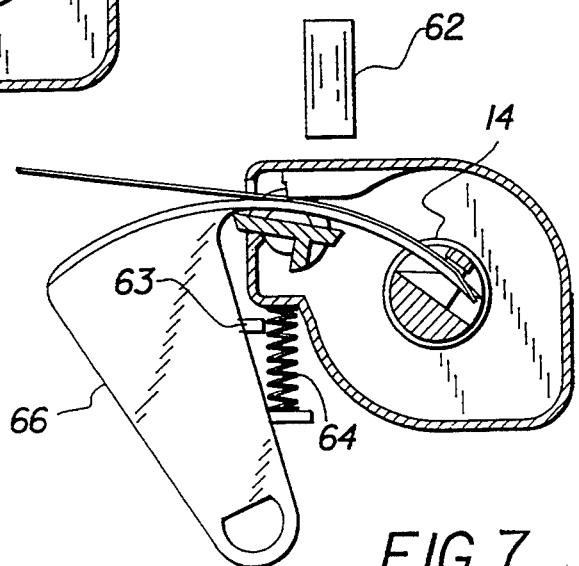
FIG. 7 is a view similar to FIG. 1 illustrating the attachment tool in the second engagement position which allows the filmstrip to be secured to the spool of the cartridge.

A first mechanism 60 is provided for orienting the cartridge 10 in the first engaging position. The mechanism 60 includes a hold down pin 62 secured to frame 61. The pin 62 may be moved between a first engaging position as shown in FIGS. 1, 2 and 4 and the non-engaging position as illustrated in FIGS. 5-7. The pin 62 may be moved between these two positions by any desired technique. In the embodiment illustrated, pin 62 is moved by a solenoid. When the pin 62 is in the first engaging position, the pin 62 presses against a portion of the cartridge 10 so that the cartridge 10 is pushed against a stop 63 which is secured to frame 61 as illustrated in FIGS. 1 and 2. Alternatively, the downward movement of the cartridge may be stopped by a drive lever, not shown, which engages the shaft of the light valve 40 for opening and closing the light valve 40.

Figure 3:
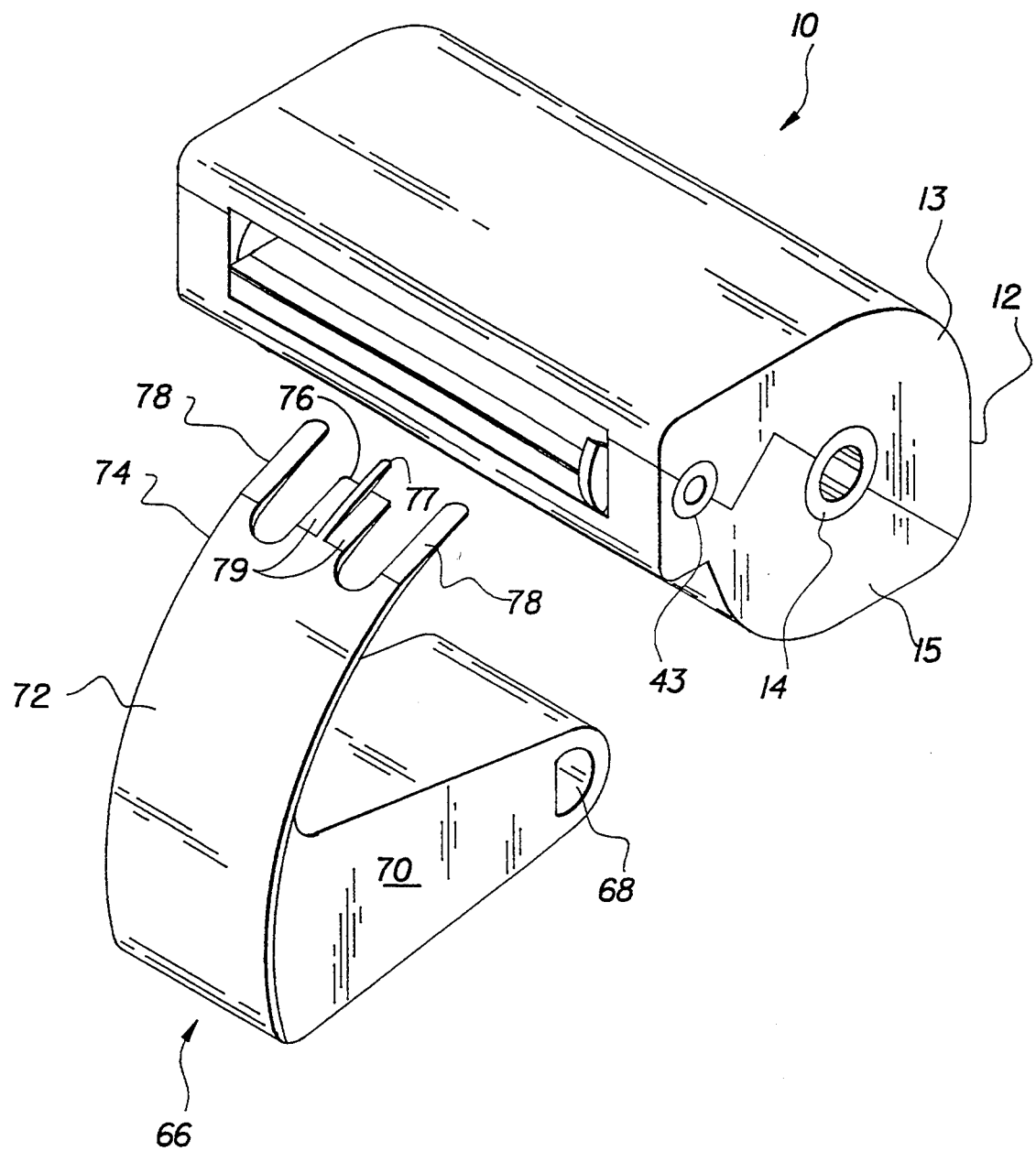
FIG. 3 is a perspective view of the cartridge of FIG. 1 and the attachment tool used to re-engage the filmstrip to the cartridge.

An attachment tool 66 is mounted to the frame 61 such that it pivots about point 68. The tool 66 includes a mounting section 70 having at its outer end an elongated engagement arcuate member 72 designed to be placed through opening 28 in cartridge 16. The member 72 has a terminal end 74 which is used to move and guide the end 18 of the filmstrip 16 into the cartridge 10. In the embodiment illustrated, terminal end 74 comprises a central engaging member 76 designed to engage opening 26 at the end of the filmstrip 16. Member 76 includes a retaining finger 77 which extends above and past an adjacent support surface 79. A pair of outer projecting members 78 are provided for supporting the lateral sides of the filmstrip 16. Means are provided for moving the tool 66 from the non-engaging position, as illustrated in FIG. 1, to the first engaging position, as illustrated in FIGS. 2, 3 and 4. In the particular embodiment illustrated, this may be accomplished by providing a drive shaft 80 which is secured to the lower end of the support member of the tool 66 and is appropriately driven by a motor, not shown, for rotating the tool 66 to the desired position. For example, a stepper motor may be used for accurately positioning of the tool 66 in the various positions during operation. However, it is to be understood that any appropriate mechanism may be used for moving of the tool 66 between its non-engaged and engaged positions. The size of the opening 28 of the cartridge 16 is such that the end 74 will easily be guided into this access opening at its first engaged position. As best illustrated by reference to FIG. 4, it can be seen that the end 74 enters into the cartridge 10 just past the opening 28 so that at least a portion of tool 66 is directly above the bottom edge 34 of the opening 28. Once the tool 66 has been positioned at its first engaging position, pin 62 is disengaged from the cartridge 10. At this point, second biasing means 64 biases the cartridge in a second direction as illustrated by arrow 81. However, the end 74 of tool 66, since it is in the opening 28, will restrict the cartridge 10 from any further rotational movement. Thus, the tool 66 orients the cartridge in a second orientation as illustrated in FIGS. 5-7. At this point, a filmstrip 16 is introduced so that it engages the end of the tool 66 (see FIG. 6). In particular, the end portion 18 is driven into the cartridge 10 so that the drive openings 26 goes past the engaging member 76 a short distance. Then the filmstrip 16 is driven in the opposite direction until the engaging member 76 engages the drive opening 26. In particular, the retaining finger 77 will pass through opening 26 and the area of the filmstrip surrounding opening 26 will be supported by surface 79 and outer projecting member 78. Once the tool 66 has engaged the end portion 18 of the filmstrip 16, the tool 66 is rotated so that the end portion 18 is moved into the cartridge 10 such that it engages the spool 14 as shown in FIG. 7 without contacting the stop 48 or any other internal feature of the cartridge. The tool 66 moves the end portion 18 of the film strip 16 between the retaining members 54 and the hub 24 so as to raise members 54 and allow projections 22 to engage openings 20. Once the filmstrip 16 has been attached to the spool 14, the tool 66 is rotated out of the cartridge 16 to the non-engaged position, as shown in FIG. 1. The spool 14 may then be rotated in the appropriate direction so as to wind of the filmstrip 16 thereon.

In the particular embodiment illustrated the filmstrip is introduced to the tool 66 when the tool 66 was positioned at the first engaging position, however, it is to be understood that the filmstrip 16 could have been introduced to the tool 66 at an earlier point in time, for example prior to the tool 66 moving to the first engaging position.

While in the particular embodiment illustrated the apparatus and method is directed to attaching a the filmstrip to a cartridge with an appropriately designed tool, the present invention can be used to detach a filmstrip from a cartridge. In such case, the filmstrip would first be thrust out of the film cartridge 10 until the filmstrip 16 is almost at its end. The cartridge 10 would then be positioned in its first orientation. The tool 66 would then be inserted just past the opening 28. The cartridge would then be allowed to go to its second orientation and the tool 66 inserted so as to disengage the end portion 18 from the spool 14. After the filmstrip 16 has been removed from the cartridge 10, then the tool 66 would be removed while the cartridge 10 is in its second orientation.

Thus, there is provided a attachment/detachment apparatus and method which is simple in operation, is repeatable and minimizes the variances that may occur in the cartridge shell and thereby improves the reliability of the reattach function since the mechanical actions are repeatable and thus insensitive to variations of the cartridge.

Is to be understood that various changes and modification may be made with departing form the scope of the present invention, the present invention being defined by the claims that follow.

Parts List:
8 . . . apparatus
10 . . . cartridge
12 . . . cartridge shell
13,15 . . . shell halves
14 . . . spool
16 . . . filmstrip
18 . . . trailing end portion
20 . . . openings
22 . . . projections
24 . . . hub
26 . . . drive opening
28 . . . opening/slot
32 . . . top edge
34 . . . bottom edge
36,38 . . . side edges
40 . . . light valve/door
42 . . . shaft
43 . . . end
45 . . . ledge section
48 . . . stop
50 . . . projection
52 . . . inclined surfaces
54 . . . retaining members
56 . . . lateral ends
57 . . . body
58 . . . contact members
60 . . . first mechanism
61 . . . frame
62 . . . hold down pin
63 . . . stop
64 . . . second biasing member
66 . . . tool
67 . . . mounting members
68 . . . point
70 . . . mounting section
72 . . . arcuate member
74 . . . terminal end
76 . . . central engaging member
77 . . . finger
78 . . . outer projecting members
79 . . . support surface
80 . . . drive shaft
81 . . . arrow

We claim:

1. A mechanism for attaching a filmstrip to a film cartridge having a take-up spool rotatably mounted therein, said cartridge having an access opening for allowing film to be inserted or removed from within the cartridge, comprising:
   a. first means for positioning the film cartridge in a first orientation;
   b. an attachment tool rotatably mounted to said mechanism for movement about a pivot point, said attachment tool having a generally arcuate guide member;
   c. means for moving said attachment tool from a non-engaged position to a first engaging position such that a portion of the attachment tool extends into said access opening;
   d. means for releasing the film cartridge from said first orientation;
   e. biasing means for biasing said film cartridge in a predetermined direction, said attachment tool, when in said first engaging position, orients said cartridge in a second orientation;
   f. means for engaging the filmstrip to said attachment tool; and
   g. means for moving said tool to a second engaging position for engaging the filmstrip to said spool.

2. A mechanism according to claim 1 wherein said biasing means comprises at least one spring.

3. A mechanism according to claim 1 wherein said means for positioning the film cartridge in the first orientation comprises a hold down mechanism and a stop for restricting further movement of the cartridge.

4. A mechanism according to claim 1 further comprising a pair of mounting members for holding said cartridge, but allowing said cartridge to move between said first and second orientations.

5. A method of attaching a filmstrip to a film cartridge comprising the steps of:
   a. providing a cartridge having a take-up spool rotatably mounted therein, said cartridge having an access opening for allowing insertion and removal of the filmstrip into said cartridge and engagement with said spool;
   b. positioning said cartridge in a first orientation by first means for orienting the cartridge;
   c. positioning a reattachment tool so that a portion of said tool is positioned with respect to said film cartridge such that when said first means for orienting the cartridge in the first orientation is released, said tool will maintain the cartridge in a second orientation;
   d. releasing said first means for orienting said film cartridge in said first orientation;
   e. providing means for biasing the cartridge in a direction such that said tool restricts further movement of said film cartridge;
   f. engaging the filmstrip to said attachment tool; and
   g. moving said tool to a second engaging position so that the film engages said spool.

6. A mechanism for attaching a filmstrip to a film cartridge having a take-up spool rotatably mounted therein, said cartridge having an access opening for allowing film to be inserted or removed from within the cartridge, comprising:
   a. first means for positioning the film cartridge in a first orientation;
   b. an attachment tool mounted to said mechanism for movement between an non-engaging position and first and second engaging positions;
   c. means for moving said attachment tool from said non-engaging position to said first engaging position such that a portion of the attachment tool extends into said access opening;
   d. means for releasing the film cartridge from said first orientation;
   e. biasing means for biasing said film cartridge in a predetermined direction, said attachment tool, when in said first engaging position, orients said cassette in a second orientation; and
   f. means for moving said tool to said second engaging position for engaging the filmstrip to said spool.

7. A mechanism according to claim 6 wherein said biasing means comprises at least one spring.

8. A mechanism according to claim 6 wherein said means for positioning the film cartridge in the first orientation comprises a hold down mechanism.

9. A mechanism according to claim 6 further comprising a pair of mounting members for holding said cartridge, but allowing said cartridge to move between said first and second orientations.

10. A mechanism for attaching and/or detaching a filmstrip to a film cartridge having a take-up spool rotatably mounted therein, said cartridge having an access opening for allowing film to be inserted or removed from within the cartridge, comprising:
    a. first means for positioning the film cartridge in a first orientation;
    b. an attachment or detachment tool rotatably mounted to said mechanism for movement about a pivot point, said tool having a generally arcuate guide member;
    c. means for moving said tool from a non-engaging position to a first engaging position such that a portion of the attachment tool extends into said access opening;
    d. means for releasing the film cartridge from said first orientation and for biasing said film cartridge in a predetermined direction such that said tool, when in said first engaging position, orients said cartridge in a second orientation;
    e. means for moving said tool to a second engaging position for engaging or disengaging the filmstrip to said spool.

11. A mechanism according to claim 10 wherein said biasing means comprises at least one spring.

12. A mechanism according to claim 10 wherein said means for positioning the film cartridge in the first orientation comprises a hold down mechanism and a stop.

13. A mechanism according to claim 10 further comprising a pair of mounting members for holding said cartridge, but allowing said cartridge to move between said first and second orientations.

14. A method of attaching or detaching a filmstrip to a film cartridge comprising the steps of:
    a. providing a cartridge having a take-up spool rotatably mounted therein, said cartridge having an access opening for allowing insertion and removal of the filmstrip into said cartridge and engagement with said spool;
    b. positioning said cartridge in a first orientation by first means for orienting the cartridge;
    c. positioning a tool so that a portion of said tool is positioned with respect to said film cartridge such that when said first means for orienting the cartridge in the first orientation is released, said tool will maintain the cartridge in a second orientation;
    d. releasing said first means for orienting said film cartridge in said first orientation;
    e. biasing the cartridge in a direction such that said tool restricts further movement of said film cartridge;
    f. moving said tool to a second engaging position so that the film engages or disengages from said spool.

15. A mechanism for attaching or detaching a filmstrip to a film cartridge having a take-up spool rotatably mounted therein, said cartridge having an access opening for allowing film to be inserted or removed from within the cartridge, comprising:
    a. first means for positioning the film cartridge in a first orientation;
    b. an attachment or detachment tool mounted to said mechanism for movement between an non-engaging position and first and second engaging positions;
    c. means for moving said tool from a non-engaged position to said first engaging position such that a portion of the tool extends into said access opening;
    d. means for releasing the film cartridge from said first orientation;
    e. biasing means for biasing said film cartridge in a predetermined direction, said attachment tool, when in said first engaging position orients said cassette in a second orientation; and f. means for moving said tool to said second engaging position for engaging or disengaging the filmstrip to said spool.

16. A mechanism according to claim 15 wherein said biasing means comprises at least one spring.

17. A mechanism according to claim 15 wherein said means for positioning the film cartridge in the first orientation comprises a hold down mechanism and a stop.

18. A mechanism according to claim 15 further comprising a pair of mounting members for rotatably holding said cartridge so as to but allow said cartridge to move between said first and second orientations.

* * * * *